(12) United States Patent
Dover

(10) Patent No.: US 10,984,136 B2
(45) Date of Patent: Apr. 20, 2021

(54) SECURE MEMORY DEVICE WITH UNIQUE IDENTIFIER FOR AUTHENTICATION

(71) Applicant: Micron Technology, Inc., Boise, ID (US)

(72) Inventor: Lance W. Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 124 days.

(21) Appl. No.: 15/693,071

(22) Filed: Aug. 31, 2017

(65) Prior Publication Data

US 2018/0307867 A1    Oct. 25, 2018

Related U.S. Application Data

(60) Provisional application No. 62/488,540, filed on Apr. 21, 2017.

(51) Int. Cl.
*G06F 21/78* (2013.01)
*G06F 21/44* (2013.01)
(Continued)

(52) U.S. Cl.
CPC ............ *G06F 21/78* (2013.01); *G06F 21/44* (2013.01); *G06F 21/6218* (2013.01);
(Continued)

(58) Field of Classification Search
CPC ...... G06F 21/78; G06F 21/44; G06F 21/6218; G06F 21/64; G06F 3/0623; G06F 21/602;
(Continued)

(56) References Cited

U.S. PATENT DOCUMENTS

| 6,385,727 B1 * | 5/2002 | Cassagnol | G06F 21/10 |
| | | | 380/259 |
| 6,904,493 B2 * | 1/2005 | Chiao | G06F 12/00 |
| | | | 713/193 |

(Continued)

FOREIGN PATENT DOCUMENTS

| EP | 3098745 A1 | 11/2016 | |
| GB | 2517016 A  * | 2/2015 | ......... G06F 21/6245 |

OTHER PUBLICATIONS

Enhancing System Security with Macronix Flash by Macronix International Co., LTD Dated: Feb. 20, 2014 pp. 12 (Year: 2014).*

(Continued)

*Primary Examiner* — Samson B Lemma
*Assistant Examiner* — Ali H. Cheema
(74) *Attorney, Agent, or Firm* — Schwegman Lundberg & Woessner, P.A.

(57) ABSTRACT

A secure memory device for secure data storage and related method are provided. The device may include an accessible data storage area configured to store data, a start location register that points to a start of the accessible data storage area, and a size-related register that allows a size of the accessible data storage area to be determined. A secret area comprises a device secret that is a value unique to the device, and that is not accessible from external to the device, and is accessible under at least one predefined conditions internal to the device, an access control element configured to prevent external access to the secret data. A generator generates a derived secret based on the storage data and the secret data that is usable to authenticate the storage data. The device may also include a memory bus over which the derived secret is communicated.

24 Claims, 7 Drawing Sheets

(51) Int. Cl.
*G06F 21/62* (2013.01)
*G06F 21/64* (2013.01)
*G06F 21/60* (2013.01)
*H04L 9/32* (2006.01)
*H04L 9/08* (2006.01)
*H04L 9/06* (2006.01)

(52) U.S. Cl.
CPC .......... *G06F 21/64* (2013.01); *H04L 9/0643* (2013.01); *H04L 9/0877* (2013.01); *H04L 9/0897* (2013.01); *H04L 9/3234* (2013.01); *H04L 9/3242* (2013.01); *H04L 9/3263* (2013.01)

(58) Field of Classification Search
CPC .......... G06F 21/10; G06F 21/31; G06F 21/62; G06F 21/00; G06F 21/71; G06F 12/1408; G06F 21/629; H04L 9/0643; H04L 9/0877; H04L 9/0897; H04L 9/3234; H04L 9/3242; H04L 9/3263; H04L 9/0838; H04L 9/06; H04L 9/08; H04L 9/32; H04L 63/045; H04L 9/0891
USPC ....... 713/193, 189, 169, 172, 184, 176, 168; 726/13; 380/259, 278
See application file for complete search history.

(56) References Cited

U.S. PATENT DOCUMENTS

| | | | | |
|---|---|---|---|---|
| 7,979,658 | B2* | 7/2011 | Obereiner | G06F 12/1441 711/164 |
| 8,386,800 | B2* | 2/2013 | Kocher | G06F 21/602 713/189 |
| 8,826,023 | B1* | 9/2014 | Harmer | G06F 21/6227 713/176 |
| 8,850,543 | B2* | 9/2014 | Von Bokern | H04L 9/0877 726/7 |
| 9,535,852 | B2* | 1/2017 | Adkins | G06F 12/1408 |
| 2002/0147918 | A1* | 10/2002 | Osthoff | G06F 21/71 713/193 |
| 2004/0255145 | A1* | 12/2004 | Chow | G06F 12/1466 726/16 |
| 2009/0132820 | A1* | 5/2009 | Hirai | G06F 21/31 713/169 |
| 2009/0328186 | A1* | 12/2009 | Pollutro | G06F 21/31 726/13 |
| 2011/0099377 | A1* | 4/2011 | Hoornaert | H04L 9/3234 713/172 |
| 2011/0099384 | A1* | 4/2011 | Grange | H04L 9/0897 713/184 |
| 2011/0252243 | A1* | 10/2011 | Brouwer | H04L 9/0838 713/189 |
| 2011/0258426 | A1 | 10/2011 | Mujtaba et al. | |
| 2013/0163764 | A1* | 6/2013 | van den Berg | H04L 9/08 380/278 |
| 2013/0254541 | A1* | 9/2013 | Yamanaka | H04L 9/0891 713/168 |
| 2015/0026330 | A1 | 1/2015 | Ahmed et al. | |
| 2015/0089247 | A1* | 3/2015 | Kang | G06F 12/1408 713/193 |
| 2015/0186651 | A1 | 7/2015 | Kim et al. | |
| 2016/0092377 | A1* | 3/2016 | Sauer | G06F 1/3243 711/163 |
| 2017/0041302 | A1* | 2/2017 | Oxford | H04L 63/045 |
| 2017/0177507 | A1* | 6/2017 | Ren | G06F 3/0623 |
| 2017/0187695 | A1* | 6/2017 | Narayanan | H04L 9/3263 |
| 2017/0372058 | A1* | 12/2017 | Kulkarni | G06F 21/629 |

OTHER PUBLICATIONS

Secure Device Identity Tutorial—by Mike Borza, John Viega, Charles Qi and Karen Zelenko Working Group—IEEEgrouper.ieee. org > groups > 802_tutorials > Jul. 5 > Sec . . . pp. 28; Jul. 18 (Year: 2005).*

"International Application U.S. Appl. No. PCT/US2018/028585, International Search Report dated Jul. 31, 2018", 3 pgs.

"International Application U.S. Appl. No. PCT/US2018/028585, Written Opinion dated Jul. 31, 2018", 11 pgs.

* cited by examiner

SECURE MEMORY DEVICE WITH UNIQUE IDENTIFIER FOR AUTHENTICATION

PRIORITY APPLICATION

The application claims the benefit of priority to U.S. Provisional Application Ser. No. 62/488,540, filed Apr. 21, 2017, which is incorporated herein by reference in its entirety.

TECHNICAL FIELD

Described herein are systems and methods relating generally to a secure memory device with a unique identifier that enables authentication of the memory contents.

BACKGROUND

In secure systems, it is desirable to have a memory device for which the contents may be verified as being correct. This may be particularly important when the memory device contains executable code potentially subject to damage or compromise. If the contents of the memory device cannot be verified as correct, it may be possible to compromise the security of the system by modifying the code contained in it in an unauthorized manner.

BRIEF DESCRIPTION OF THE DRAWINGS

In the drawings, which are not necessarily drawn to scale, like numerals may describe similar components in different views. Like numerals having different letter suffixes may represent different instances of similar components. The following drawings do not limit the scope of the invention but rather are provided for the purpose of illustration.

DETAILED DESCRIPTION

Figure 1:
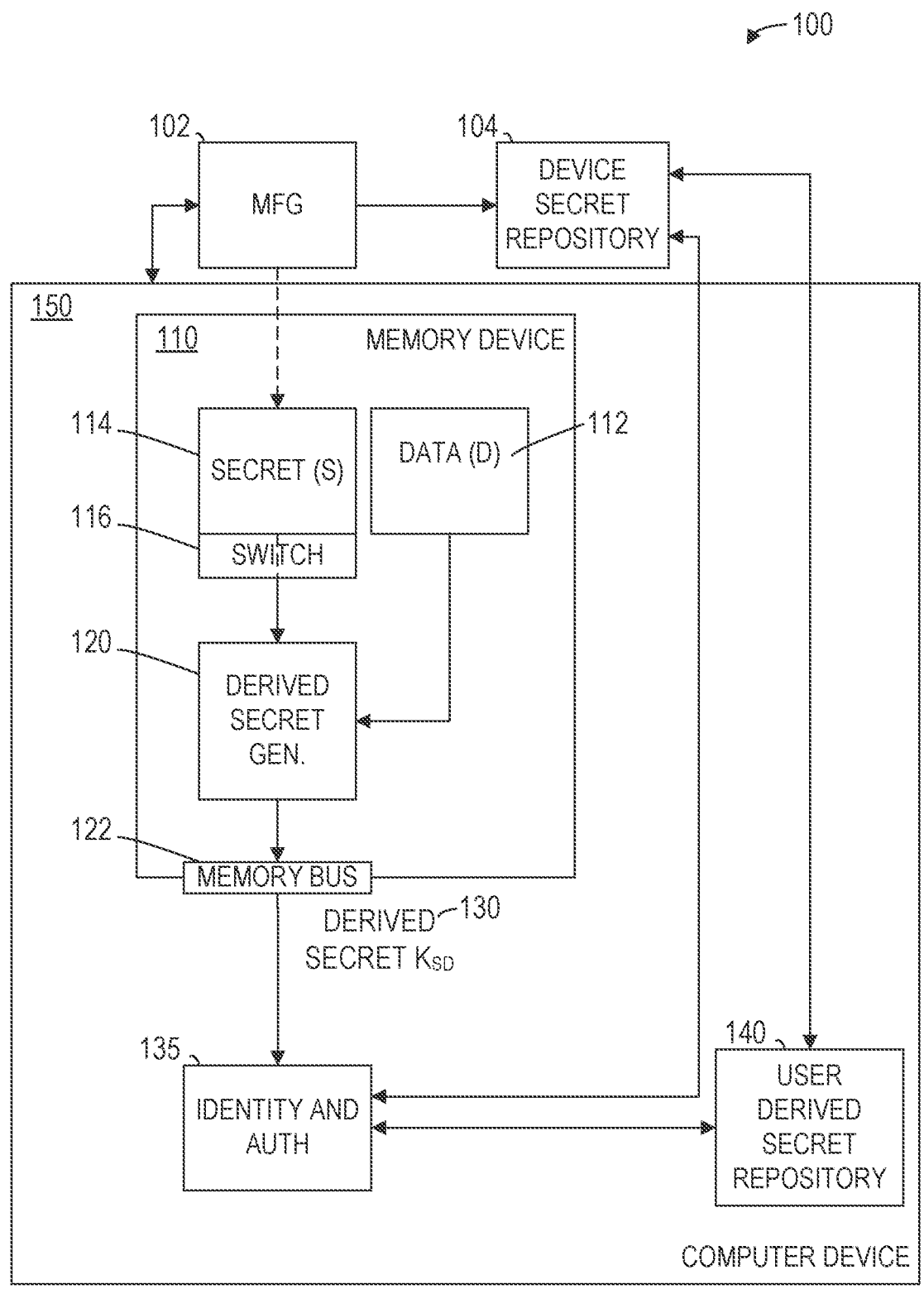
FIG. 1 is a block diagram of a system that utilizes an implementation of a secure memory device and its operation.

In the following description, for purposes of explanation, numerous specific details are set forth in order to provide a thorough understanding of some configurations. It will be evident, however, to one skilled in the art that the present disclosure may be practiced without these specific details.

Disclosed herein is a secure memory device for secure data storage. The term "data" as used herein refers to any content stored in the secure memory device, where it represents information, instructions, etc. The device includes an accessible data storage area configured to store data, and a secret area comprising a device secret that is a value unique to the device. In some examples, the secret area is not accessible external to the device, and is accessible under one or more predefined conditions internal to the device. In some examples, the secure memory device is configured to restrict, and in some cases prevent, external access to the device secret. The secure memory also includes a generator that generates a derived secret based on the storage data and the device secret that is usable to authenticate the storage data. In many examples, the secure memory device is configured to communicate the derived secret to another entity external to the memory device, such as one that will perform authentication of at least some portion of the stored data based on the derived secret. In many examples, this communication will be across a bus of the secure memory device, such as, for example, a memory bus. In some examples, the secure memory device will include a start location register that points to a start of the accessible data storage area, and a size-related register that allows a size of the accessible data storage area to be identified.

Also disclosed herein is a method for operating a secure memory device for secure data storage, including storing a device secret in a secret area of the device, and storing storage data in an accessible data storage area of the device. The method also includes allowing access to the secret data by an access control element during an access time period, and generating a derived secret based on the storage data and the device secret accessed during the access time period. As noted above, in many examples, the drive secret will be communicated to an entity external to the secure memory device, such as a host system, that will perform authentication of at least some portion of the stored data based on the derived secret. In many examples, this communication will be across a bus of the secure memory device, such as, for example, and a memory bus. In some examples, the device will store the storage data in the storage area of device through use of a start location register that points to a start of the accessible data storage area and a size-related register that allows a size of the accessible data storage area to be determined.

Various configurations described herein are directed to using a secure memory device. The secure memory device described herein may be used in processing systems incorporated with various appliances, vehicles, industrial equipment, Internet of Things (IoT) devices, etc. Such processing systems may include embedded systems or other control or communication systems. Other processing systems that that may utilize the memory devices described herein include laptop computers, desktop computers, mobile computing devices, servers, etc. For purposes of the present description, all such devices of the various types addressed in this paragraph making use of a secure memory device and/or the method of use of a secure memory device, either as generally described herein, will be referred to as a "host system."

In one configuration, the secure memory device may be based on NOR technology, which utilizes NOR logic gates for speed. In another configuration, only an area of the memory that utilizes certain secure capabilities of the device (a secure area) utilizes NOR logic gates. In other examples, the secure memory device may include flash memory NAND flash alone or in combination with NOR flash), and/or one or more other forms of non-volatile memory such as FeRAM, MRAM, PCRAM, and combinations thereof. The data storage could also be implemented, at least in part, in DRAM. The components of the secure memory device as described herein may be represented in various physical implementations, such as where the data storage area, secret data area and additional security components (for example, the described access control element and generator) may all be implemented: on a single die; on multiple die stacked relative to one another; or in the form of a memory module (such as, for example, memory cards (for example, Compact Flash cards, Secure Digital cards, eMMC cards, and other assemblies analogous thereto), solid-state drives (SSDs), and other special purpose configurations, etc. The secure memory device may be implemented with any desired storage area capacity and configuration. For example, the storage area may be formed of one or more 3D Flash memory die, with memory cells in either a single level cell (SLC) or multi-level cell (MLC) bit storage configuration bid storage configuration. As one example, a secure memory device may be implemented as a 128 Mb (NOR) flash memory. In this illustrative example, the secure memory device may comprise cryptographic security features that are based on a symmetric key approach, which may use, for example, a Secure Hash Algorithm (SHA)-256-based keyed-hash message authentication code (HMAC) engine.

The symmetric key (such as the HMAC session key in FIG. 3, discussed below) may be used in a general sense to authenticate messages or commands that come into the device.

The device itself may include the described device secret including a value unique to the memory device. The device secret may be set in the secret area of the device, for which access to the secret area from external to the device is not possible, and access from internal to the secure memory device is limited subject to stringent conditions that prevent the contents of the secret area (i.e., the device secret) from being discoverable except as expressly permitted.

The disclosed system of providing for a device secret and hashing function on a memory device has benefits over traditional verification processes that implement this with dedicated hardware and/or software (e.g., a trusted protection module—TPM). For example, in traditional trust processes, a Read Only Memory (ROM) based bootloader may utilize a device secret to encrypt confidential data and/or to authenticate the device to a manufacturer or other party. The problem with this approach is that if the device secret is exploited (for example through a corrupted or compromised boot loader) device security is lost. While some bootloaders protect the device secret from further layers by utilizing a derived key for next layers, the fundamental weakness of the bootloader remains: if the bootloader is compromised, then the device key will be compromised also. Further weaknesses include the need for utilizing a secure bus for transmission of code or device secrets used in generating the derived secret. As can be appreciated, implementing this securely is expensive and may require specific hardware and software.

The disclosed memory device solves these problems by providing a memory device that in some examples may be implemented to provide for device secret storage and generating a derived secret without requiring adapted pin-outs or a modified memory interface to communicate with a host device. This allows devices which incorporate the memory device to take advantage of these trust processes without implementation of special hardware. By implementing the device secret and the derived secret (in the described example, generated at least in part through a hashing function), at the memory device, the verification may be implemented securely, since it is assumed that the code sending the derived secret has been verified and is trusted. If the derived secret is compromised, then the device will not be verifiable—the verification can be implemented by sending information over an insecure bus, and the sending will only succeed if it has not been tampered with. This implementation additionally can remove the risk that a compromised bootloader could expose the device secret.

The secret area may be established in any of multiple configurations. In some examples, the secret area may be present in a read-only memory (ROM) portion of the device established at the time of manufacture, or it could be set later, provided this is done under secure/controlled conditions. This device secret may be implemented as one or more electronically programmed fuses or antifuses programmed to store the device secret. In some examples, the device secret may be retained in flash memory cells in the secret area. This configuration provides advantages in facilitating the periodic changing or updating of the device secret, as may be desirable for maintaining the described security of the device.

In one configuration, the device secret remains secret to the outside world—with a possible exception of the device manufacturer or the end client to whom the manufacturer has shared this information (however, external access to the secret from the device itself may not be allowed). This prevents someone else from copying the secret and thereby impersonating or controlling the device. Even though the memory device does not share the secret itself, it may still share information about the secret to identify itself (when combined with key information) and verify the data within the memory without compromising the secret. In other examples, access to the device secret may be allowed under limited restricted conditions, so as to facilitate the above-discussed changing/updating of the device secret. In some examples, the data that is verified may be firmware of the memory device. In other examples, the data that is verified may be boot code of a device that the memory device is installed in. In still other examples, other data may be verified.

One way that this verification may be achieved is through the use of a hash function, which ensures the integrity of a block of data. A hash function maps data having an arbitrary size to data of a fixed size. It is created to be a one-way function, i.e., one that is very easy to calculate for a given block of data, but very difficult to reconstruct (or to construct equivalent alternatives) using different data by knowing the hash value. This allows it to be used for ensuring the integrity of a block of data.

In some examples of the secure memory device, a keyed-hash message authentication code (HMAC) may be utilized. The HMAC is a specific type of message authentication code (MAC) that uses a cryptographic hash function and a secret cryptographic key, and may be used to simultaneously verify both the data integrity (the hash function creates a unique identifier for the block of data) and the identification of the memory device (the cryptographic key may verify the identity of the key holder). Any cryptographic hash function may be utilized by the memory device. A SHA-256 cryptographic hash algorithm is one that is not difficult to calculate, but is quite strong—the algorithm generates an almost-unique 256-bit signature (or digest) for a text or data store.

FIG. 1 is a block diagram of a host system 100 that utilizes an implementation of a secure memory device 110 and its operation, as described above. In the hypothetical use case discussion below, the secure memory device 110 is described as used with a host system, which in the discussed example is discussed as a computer device 150. As noted previously herein the host system could be any of a wide variety of systems making use of a secure memory device such as an example device 110. Such a use may benefit from initial boot code that is authenticated to ensure secure operation of the computing device 150, and thus, the secure memory device 110 has a data (D) 112, portion which may comprise the authorized boot code. It may also have a secret (S) 114 portion that may be set by the manufacturer 102 at the time of memory device manufacture (illustrated by the dashed line in FIG. 1) or by the device purchaser who may acquire the device secret from the manufacturer or may reset the device secret according to a predefined provisioning process that ensures security and integrity of the secure memory device 110. As noted above, in some examples, the device secret 114 may be stored in a read-only memory (ROM) so that it is an unchangeable feature of the memory device 110, or, in the alternative, it may be stored in a location that is only changeable under certain very limited circumstances, such as in a secure reprovisioning procedure.

An access control element 116, such as an electronic operable switch, which may be implemented by in any suitable form (as one example, through microcode logic), may be provided in the secure memory device 110 to prevent external access to the secret area and the device secret 114 stored therein. The switch 116 may be closed only during a particular time, such as the initial startup of the device, and once the startup or a portion thereof is complete, the switch may be opened preventing any further access to the device secret 114. When the switch 116 is closed, a derived secret generator 120 in the memory device may be used, for example, as a part of the initial startup sequence for the device 110, to generate a derived secret. In an example implementation, the derived secret generator 120 may perform a hash function on the device secret 114 and the data 112 to generate the derived secret $K_{SD}$ 130, for example:

$$K_{SD}=f(S,D)$$

where f( ) is an HMAC such as SHA-256.

With this approach, the derived secret $K_{SD}$ 130 depends not only on the content of the data 112 (because the hash uniquely identifies the data content), but the device secret as well 114 (because the device secret uniquely identifies the device). It would be essentially impossible to regenerate this value without knowing the device secret, due to the nature of the hash function and the extremely large number of possible values it may take on. Once the derived secret 130 has been determined, the switches are opened to prevent further access to the device secret 114 (except in rare circumstances, such as, for example, a reprovisioning of the device 110).

The switch 116 above is described as being closed when the device secret 114 may be accessed, and open when the device secret 114 cannot be accessed. This is true if the switches are in series with the access lines. However, in another configuration, the switches could shunt to ground or high voltage level, in which case a closed switch would prevent read access and an open switch would allow read access. Although for the sake of simplicity herein, a reference to an open switch may be used to imply prohibiting access, and a closed switch may be used to imply granting access, the concept applies regardless of whether the series or shunt configuration is used.

The derived secret 130 could also be generated in response to an externally issued command to do so. Such a command may close the switch 116 to allow access so that the device secret 114 may be read by the derived secret generator 120. Another command may be issued to open the switch to disallow access once the device secret 114 has been read by the derived secret generator 120. Such commands may be executed in an exclusive mode, i.e., a mode in which it is the only operation allowed to run, to prevent other operations from improperly accessing the device secret 114 while the switch is closed. In some examples, the switch 116 may automatically open based on some predefined condition such as time or certain data signals so that a separate open switch command is not needed. The derived secret $K_{SD}$ 130 may be communicated external to the secure memory device 110 over a memory bus 122 that interfaces with the device.

In one configuration, the derived secret $K_{SD}$ 130 may be utilized by an identification and authorization process 135 to verify that the correct data 112 is present. This could be achieved by accessing a device secret repository 104 at a secure site, such as a site associated with the manufacturer of the secure memory device or with the host system incorporating the secure memory device). Although the device secret 114 itself is not directly compared, the repository 104 knows the device secret and the authentic data 112 that should be present in the memory device 110, and therefore it may create its own version of the derived secret $K_{SD}$ 130 for comparison. In one configuration, the manufacturer may synchronize its derived secret 130 with one stored in a user derived secret repository 140 on or associated with the computer device 150. This could be performed via a secure network link and synchronization software between the external site (e.g., manufacturer's database) containing derived secrets and a similar database on the host system (here computer device 150). Alternatively, the verification could be performed locally by providing the information to the end-user via, e.g., a flash memory, that may be synchronized with a computer database on a local computer of the end user so that computers external to the end user need not be accessed. Then the identification and authorization process 135 need only look to the readily accessible user derived secret repository 140 to perform the authentication. While it may also be possible to store and use the manufacturer's copy of the device secret 114 in the repository 140, such a configuration would have to be operated under the strictest security provisions and could present a greater risk of compromising the device secret 114.

Figure 2:
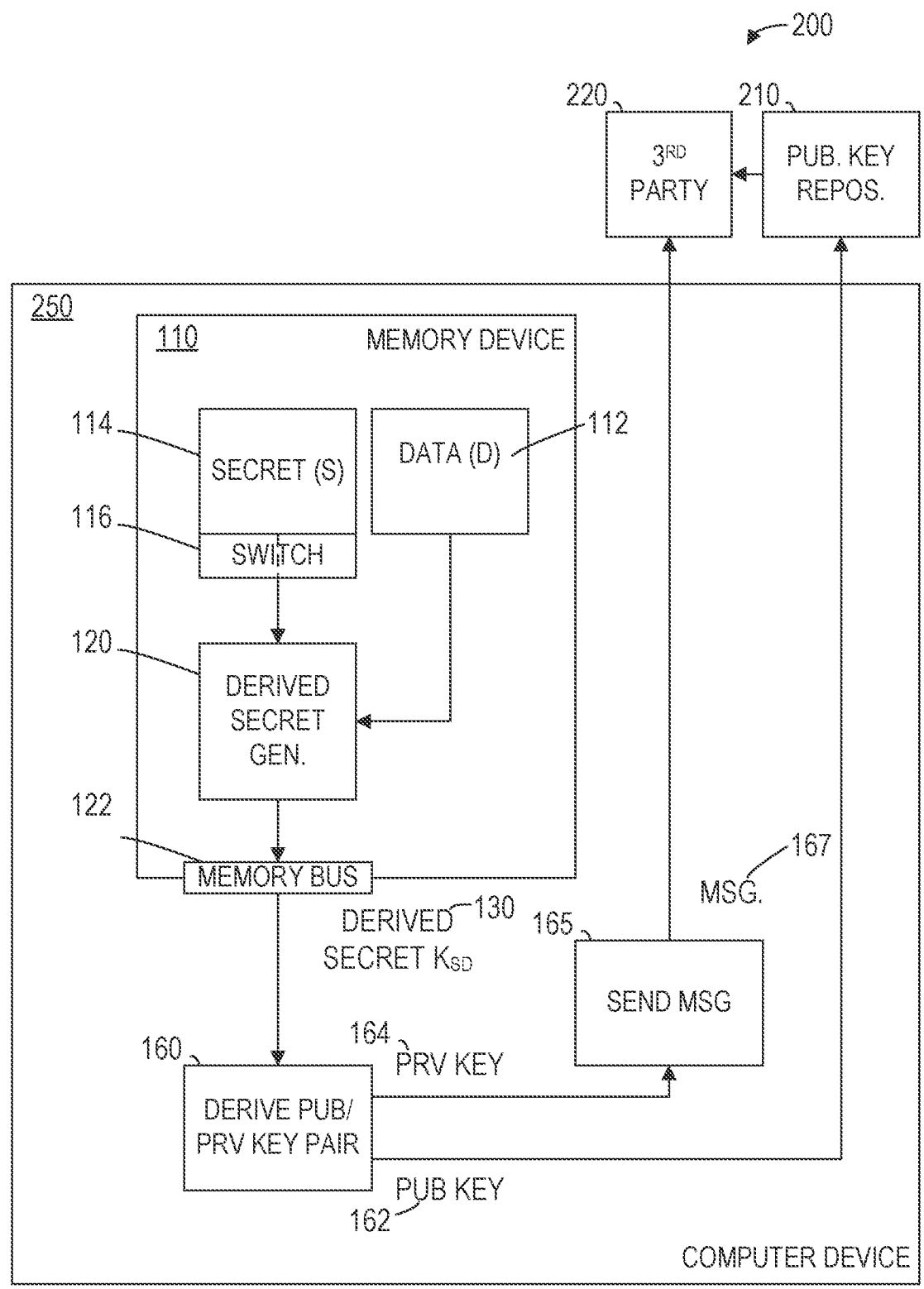
FIG. 2 is a block diagram illustrating another configuration of the system in which the computer uses a public-private key pair to perform the authentication.

FIG. 2 is a block diagram illustrating another configuration of a host system 200, having some elements in common with the host system 100 of FIG. 1 (including secure memory device 110), and thus directly analogous elements to those of host system 100 are numbered similarly in FIG. 2 will not be discussed again). In host system 200 a computer 250 uses a public-private key pair to perform the authentication. In this configuration, the derived secret KSD 130 is used by a derivation process 160 to generate a public-162 private 164 key pair, with the public key 162 being provided to a public key repository 210. A send message process 165 uses the private key 164 to sign a message 167 and send it to a remote entity (described here in the example of a third-party 220). The signature of the derived secret KSD 130 may be independently verified by the third-party 220 using the public key 162. If the signature was not a signature of the derived secret KSD 130, then that third-party 220 would be able to determine that the data 112, KSD 130, or derivation process 160 is not in an expected state or functioning properly. For example, the boot code may have changed either due to an error or an attack.

Figure 3:
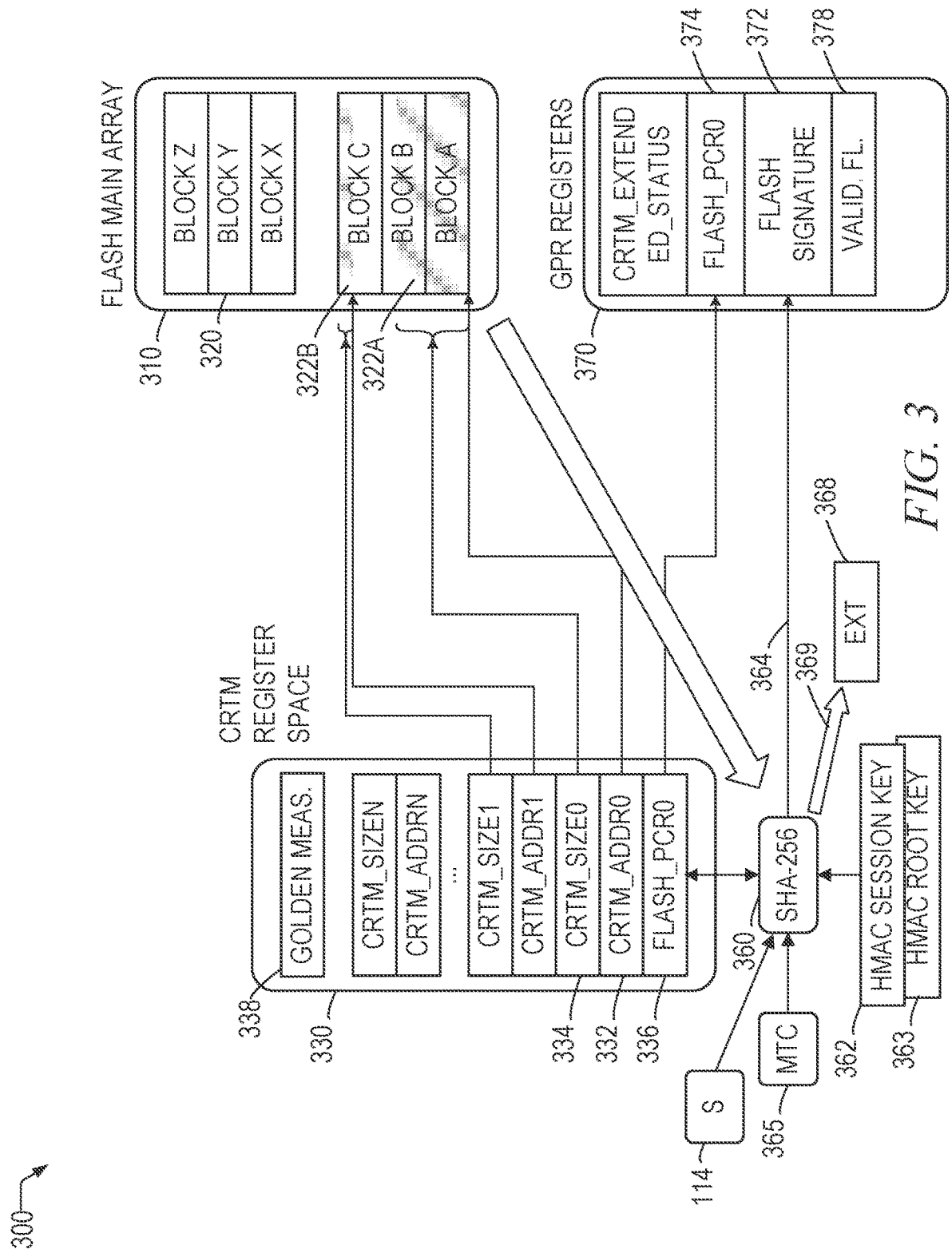
FIG. 3 is a block diagram illustrating an internal register structure of an example device.

FIG. 3 is a block diagram of the internal register structure 300 of an example of a memory device 110. The internal register structure 300 may be utilized to hold secure memory device 110 values for operations that are internal to the secure memory device 110 and to provide controlled access to certain values contained within the memory device 110.

The secure memory device 110 contains a data storage area, represented as flash main array 310; a core root of trust for measurement (CRTM) register space 330; and general purpose registers (GPR) 370. The flash main array 310 may comprise one or more non-volatile memory blocks 320 that may be of any desired size, for example, 64 KB, and that are cryptographically protected. Although a password may be utilized for write authorization, this permits the password to appear visibly on the flash bus. Therefore, in the alternative, write authorization may be provided via a command signature. With this configuration, a signed Auth_Lock command may be sent to the device before nonvolatile block lock bits may be modified. Block lock bits may be stored to indicate permitted accessibility of data blocks 320 in the flash main array 310. However, the Auth_Lock may be used as essentially a key to protect the block lock bits, which in turn protect access to the data blocks 320. Therefore, in contrast to a password-based configuration, since the Auth_Lock command signature (e.g., a cryptographically secured command—the key used to secure the command may be, e.g., the HMAC session key 362) is sent instead of a password, the secrecy of the signing key may be preserved. Similar functionality may be provided for read authorization.

Using this scheme, blocks 320 may be individually protected in a nonvolatile manner such that they power up in a protected (unmodifiable) state. They are thereby effectively ROM blocks 320 unless the correct signing key is known for the Auth_Lock command. This provides significantly enhanced protection over block locking or password protection where the command may be sent at any time or the password is exposed in the clear. In some examples, once a flash block 320 is locked and protected as described above, nothing may be done to modify its contents. But in the case of a flash array malfunction (e.g., a bit error, etc.) or a key compromise by malware, the flash contents could be changed and/or measurements could be spoofed. Such compromised flash is considered untrustworthy. However, even though the protection measures may have been intentionally or unintentionally circumvented, the compromise may still be detected through the above-described process, which may be referred to as measurement and attestation.

In more detail, "measurement" of a block refers to the action of taking hash, such as a SHA-256 digest 360 of a portion of code/data 322A, 322B (within the main flash array 310). These portions 322A, 322B may or may not align with the block 320 boundaries. As may be seen in FIG. 3, a first portion 322A occupies approximately one and two-thirds of a block in Block A and Block B, and a second portion 322B occupies approximately one-third of Block C. The portions 322A, 322B to be measured may be identified by way of, for example, an address register CRTM_ADDR0 332 that points to a start location or address of a portion 322B, and a size register CRTM_SIZE0 334 that indicates the length of the portion 322B. There may be any number of portions referenced in this manner By way of example, the system boot code is stored in the first portion 322A. At the request of a host command to measure the first portion, the SHA-256 360 value may be taken and the result stored in a register FLASH_PCR0 of the CTRM register space 330 and in a register FLASH_PCR0 374 of the GPR registers 370. The measurement 336 may then be signed by a secret key 362 and provided 369 to the system software for comparison 364 with a local 338 or remote 368 "golden measurement", which may be a previously calculated derived secret value for the data stored in that region of memory. If the two digests (measurements), i.e., the calculated and the stored, match, then the measured code in the flash device (or other given portion) may be considered unmodified with high confidence. This process (remote attestation) works because a SHA-256 digest of a piece of code/data may be considered intractably unique. In other words, it is not computationally feasible for another dissimilar piece of code/data to be constructed such that it will measure to the same digest as the code inquestion.

Therefore, if high value code, such as low-level boot code, in the flash device (e.g., the CRTM) is measured and locally or remotely compared to a golden CRTM measurement, it may be determined that the flash CRTM is, in fact, unmodified and trusted. To further strengthen this process, the measurement may be signed using a key 362 by the flash device so that the remote measurement and comparison agent may know with a high degree of confidence that the measurement it received came from the flash device it believed it was communicating with. A host request may be used to ask for the measurement value and to initiate the measurement value being signed and provided with its signature 372 in the device GPR 370. The GPR 370 may be provided as a mechanism for layering address spaces to provide access to different registers within the device utilizing a limited number of address lines. Thus, the registers shown in the GPR 370 are not fixed to those illustrated in FIG. 3, e.g., the FLASH_PCR0 374 could hold any of the registers from the CRTM register space 330.

The HMAC session key 362 may be generated based on the HMAC root key 363 that may be put into the device, and is derived based on a counter (e.g., a monotonic counter MTC) 365 that is incremented each time the device is powered on, which results in a different HMAC session key 362 for each power cycle of the device 110. This may be provided for "anti-replay", i.e., to prevent duplication of command sequences and responses, key generation, etc.

This process as a whole is generally referred to as trusted or measured boot and is a capability that a system's trusted platform module (TPM) may enable. By measuring code from the lowest level all the way up through the OS loader and the OS, possibly in successive steps, a system's state and overall integrity may be determined to be valid.

To be most effective, the initial code measurement by the flash device 110 may be done automatically at each power-up event. This prevents any system code stored in the device from interfering in the measurement process, and is precisely why the flash is therefore acting as a root of trust. Even if the lowest level of system code 332A has been compromised, if compromised code is not allowed to execute with privileges until it is measured and provided to a remote authority 368, then any code that is allowed to execute can be considered uncompromised, and the code's validity may be assured.

An incorrect or lack of measured code transmission may be detected as an issue by the remote authority and dealt with accordingly (e.g., by notifying a designee of the problem), the results to the affected client are that it may be denied the boot privileges it was seeking, thereby creating a denial of service (e.g., rendered inoperable).

Such a situation may be addressed by the concept of recovery within the flash device 110. Instead of having to communicate a signed measurement 369 of the flash contents 322A to a remote authority 368, the flash instead may also store a local golden measurement 338 for its own comparison purposes. In this way, after an automatic measurement is taken by the flash, it may then proceed to compare this to its own stored golden measurement 338. If the compared values are equal, then it may be determined with high confidence that the flash contents are unmodified and the system boot may proceed.

If, however, the comparison fails, it may be concluded that the flash contents 322A are no longer valid and this code should not be executed by the system. The flash may then enable a previously validated hidden block of flash storage 378 to temporarily replace the corrupted block so that the system may commence its boot process. This act of recovery or "self healing" may then be detected by remote attestation software and dealt with accordingly. Furthermore, this "self healing" can be generalized to any data and is not restricted to boot code.

Figure 4:
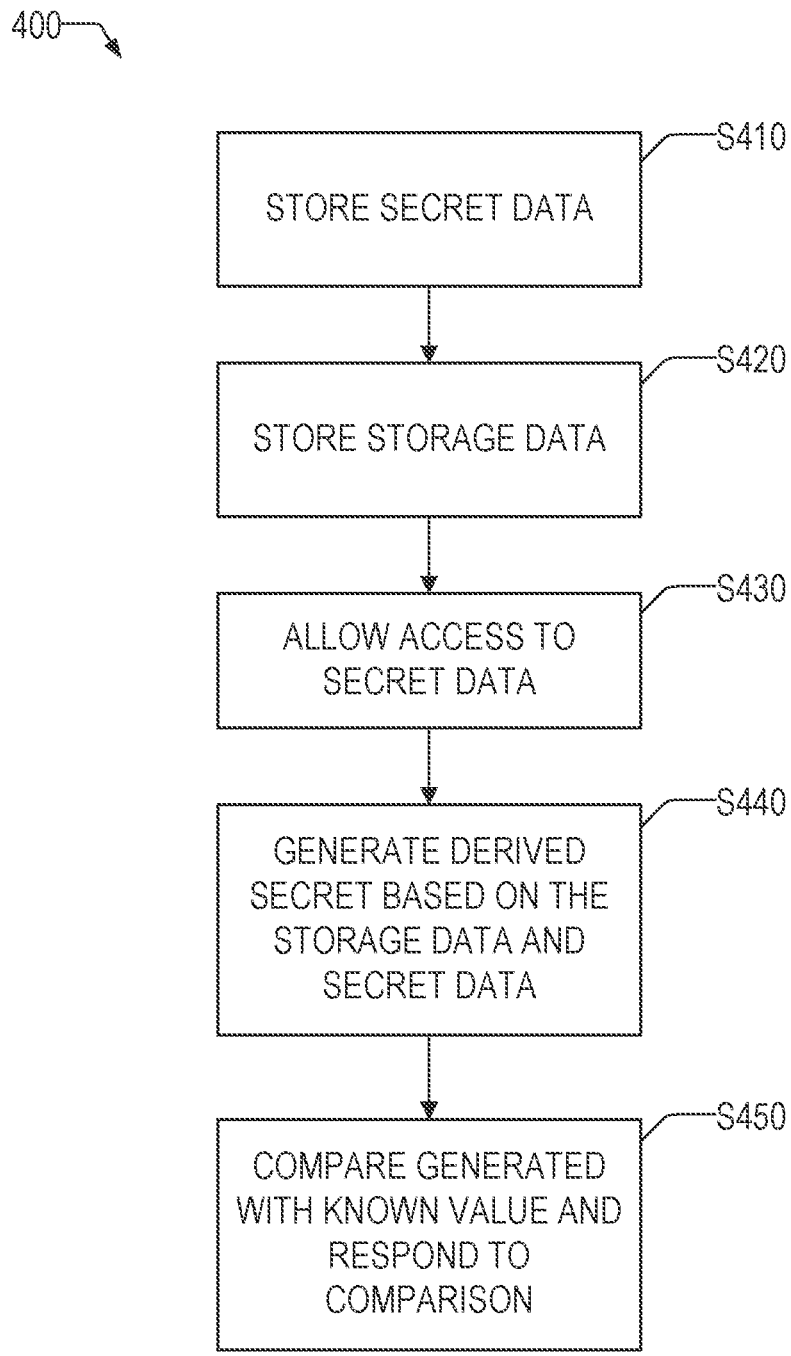
FIG. 4 is a flowchart illustrating a process that may be performed by the system.

FIG. 4 is a flowchart illustrating a process 400 that may be performed by the system. In operation S410, the device secret (S) 114 data is stored in the secret area of the device. In operation S420, storage 112 data (D) is stored in an accessible data storage area (322A) of the device (110). In operation S430, the access control element 116 allows access to the device secret 114 data, and in operation S440, while access is allowed to the device secret 114 data during an access time period, the derived secret 130 is generated that is based on the storage 112 data and device secret 114 data during the access time period. The derived secret 130 may be communicated to an external entity over the memory bus 122. In operation S450, the derived secret may be compared with a known value for the data (D) that may be stored on the device provide the derived secret for an external comparison. If the comparison is a match, then normal operations may continue to a next stage. However, if the comparison does not match, then the data (D) may be corrupt and further execution/access is either terminated or a recovery process described above may be executed.

The process 400 may further comprise allowing access to the device secret 114 data by the access control element only when the generator is accessing it to generate the derived secret 130 and to disallow access at other times. The access control element may allow access to the device secret 114 data based on an allow access command. The generator may generate the derived secret using a keyed-hash message authentication code (HMAC), as described above. The process 400 may further comprise, at operation S450, responding to a comparison of the generated derived secret 130 based on a previously calculated derived secret, and when the comparison result is that the generated derived secret is equal to the previously calculated derived secret, then normal operation may continue. However, when the comparison result is that the generated derived secret is not equal to the previously calculated derived secret, then exception handling may be performed.

Figure 5:
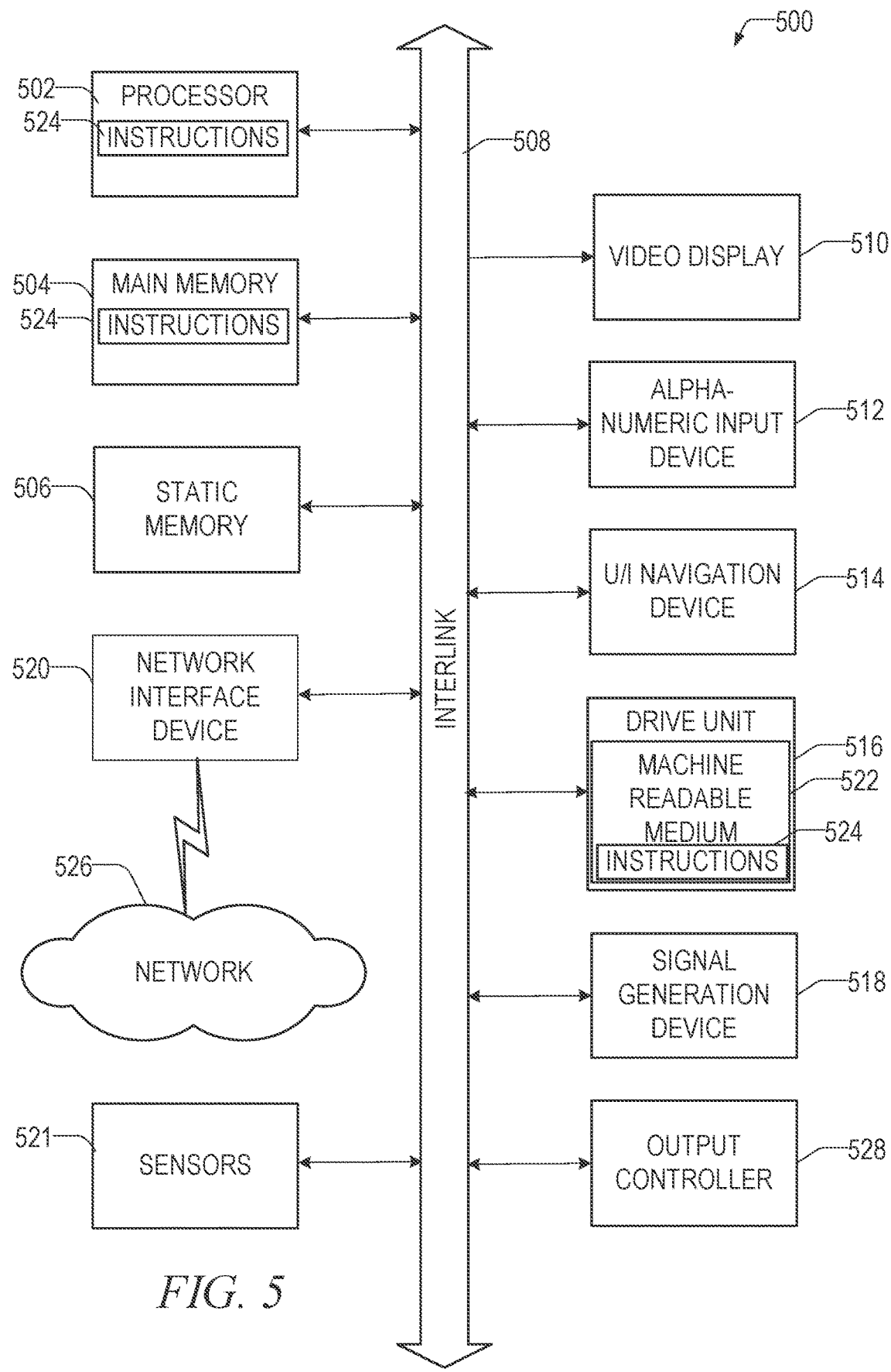
FIG. 5 is a block diagram illustrating a machine that may be a computer on which various processes described herein may be performed.

FIG. 5 is a block diagram illustrating a machine that may be a computer on which various processes described herein may be performed. The machine (e.g., computer system) 500 may include a hardware processor 502 (e.g., a central processing unit (CPU), which may be an implementation of the computer device 150 discussed above, a graphics processing unit (GPU), a hardware processor core, or any combination thereof), a main memory 504 and a static memory 506, which may be an implementation of the memory 324 discussed above, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In a configuration described herein, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB)), parallel, or other wired or wireless (e.g., infrared(IR), near field communication (NFC), etc.) controller connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In a configuration, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. The term "machine readable storage medium" is used to define hardware structures capable of storing and/or encoding instructions or data. Non-limiting examples of machine readable storage medium configurations may include solid-state memories, including those described herein, and optical and magnetic media. Specific configurations of machine readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. Any of such semiconductor memory devices may be present in the form of discrete memory devices or in units of data or instruction storage capability in semiconductor die having additional functionality, such as, for example, cache memory and processors, or other controllers, and the like. In some configurations, machine readable media may include other forms of non-transitory machine readable media. In terms of the present specification, the term "non-transitory" expressly excludes propagating signals.

The instructions 524 may further be transmitted or received over the communications network 526 using a transmission medium via the network interface device 520. The term "transmission medium" is defined herein to include any medium that is capable of carrying data structures or units, or instructions for execution by the machine, and includes digital or analog communications signals or other medium to facilitate communication of such software.

The machine 500 may communicate with one or more other machines 500 utilizing any one of a number of transfer protocols (e.g., frame relay, internet protocol (IP), transmission control protocol (TCP), user datagram protocol (UDP), hypertext transfer protocol (HTTP), etc.). Some communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 500. In a configuration, the network interface device 520 may include one or more physical jacks (e.g., Ethernet, coaxial, or phone jacks) or one or more antennas to connect to the communications network 526.

In a configuration, the network interface device 520 may include multiple antennas to wirelessly communicate using at least one of single-input multiple-output (SIMO), multiple-input multiple-output (MIMO), or multiple-input single-output (MISO) techniques. In some configurations, the network interface device 520 may wirelessly communicate using Multiple User MIMO techniques.

A wide variety of computing devices may constitute a machine 500, as described herein. The following list includes a variety of devices that may fit the definition of a machine 500: a personal data assistant (PDA), a cellular telephone, including a smartphone, a tablet computing device, a laptop computer, a desktop computer, a workstation, a server computer, a mainframe computer, and the like.

Figure 6:
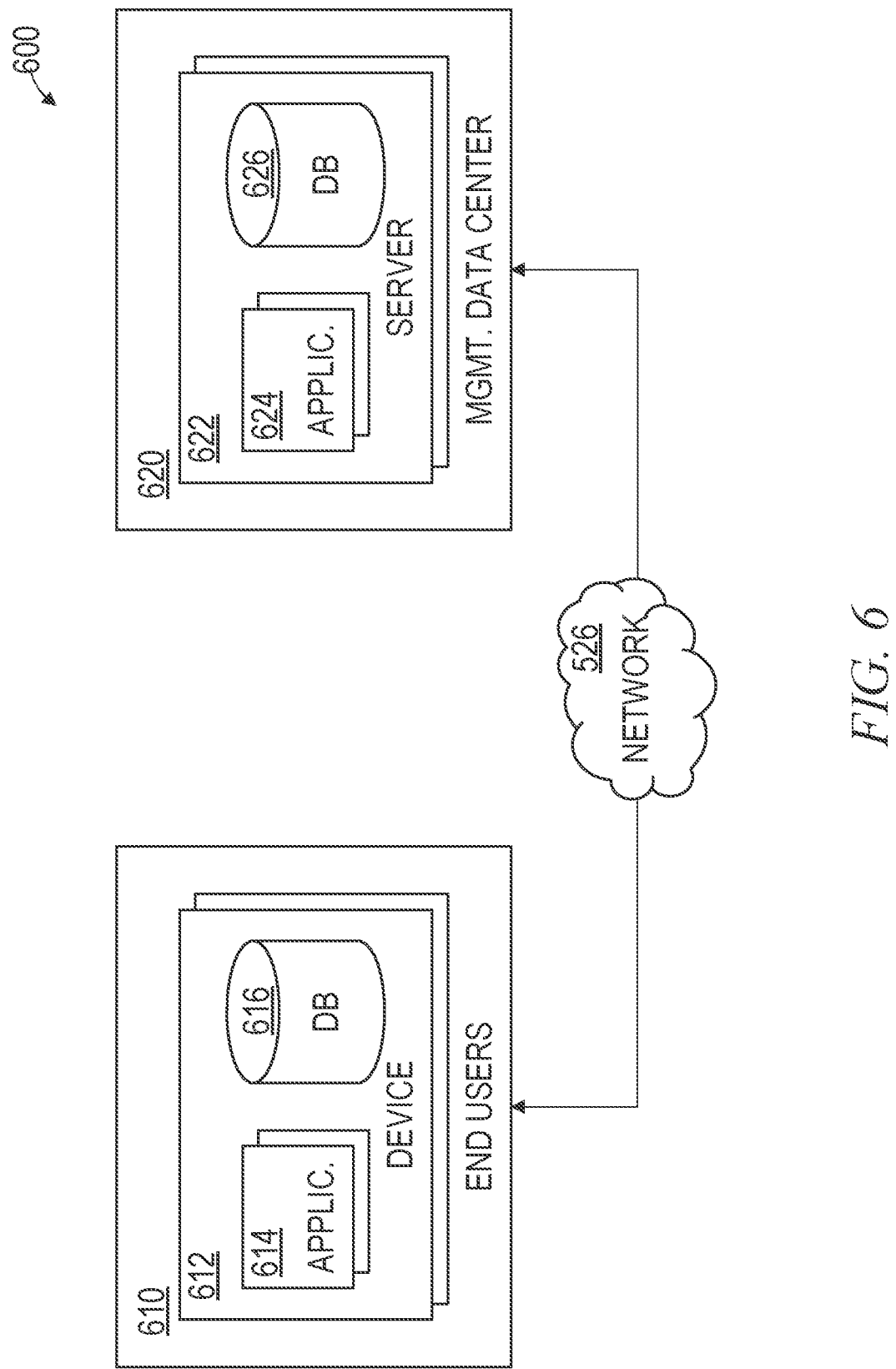
FIG. 6 is a block diagram of a network distributed system that may include a client-server architecture or cloud computing system.

FIG. 6 is a block diagram of a network distributed system 600 that may include a client-server architecture or cloud computing system. Distributed system 600 may have one or more end users 610. An end user 610 may have various computing devices 612, which may be machines 500 as described above. The end-user computing devices 612 may comprise applications 614 that are either designed to execute in a stand-alone manner, or interact with other applications 614 located on the device 612 or accessible via the network 526. These devices 612 may also comprise a data store 616 that holds data locally, the data being potentially accessible by the local applications 614 or by remote applications.

The system 600 may also include one or more management data centers 620. A data center 620 may be a server 622 or the like associated with a business entity that an end user 610 may interact with, and may include computers of the manufacturer 102, device secret repository 104, public key repository 210, and third-party 220 computers, as discussed above. Thus, the network architecture for communicating the derived secrets between a computer using the memory device and the manufacturer computers may be implemented by the system 600 of FIG. 6. The business entity may be a computer service provider, as may be the case for a cloud services provider, or it may be a consumer product or service provider, such as a retailer. The data center 620 may comprise one or more applications 624 and databases 626 that are designed to interface with the applications 614 and databases 616 of end-user devices 612. Data centers 620 may represent facilities in different geographic locations where the servers 622 may be located. Each of the servers 622 may be in the form of a machine(s) 500.

The end-user devices 612 and data center servers 622 may be configured to connect with each other via the network 526, and access to the network by machines may be made via a common connection point or different connection points, e.g. a wireless connection point and a wired connection. Any combination of common or different connections points may be present, and any combination of wired and wireless connection points may be present as well. The network 526, end users 610, and data centers 620 may include network hardware such as routers, switches, load balancers and/or other network devices. The end user device 612 may be, for example, a machine 500 that is a computing device or IoT device comprising one or more of the secure memory devices 110, as described above.

Other implementations of the system 600 are also possible. For example, devices other than the client devices 612 and servers 622 shown may be included in the system 600. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 622.

Figure 7:
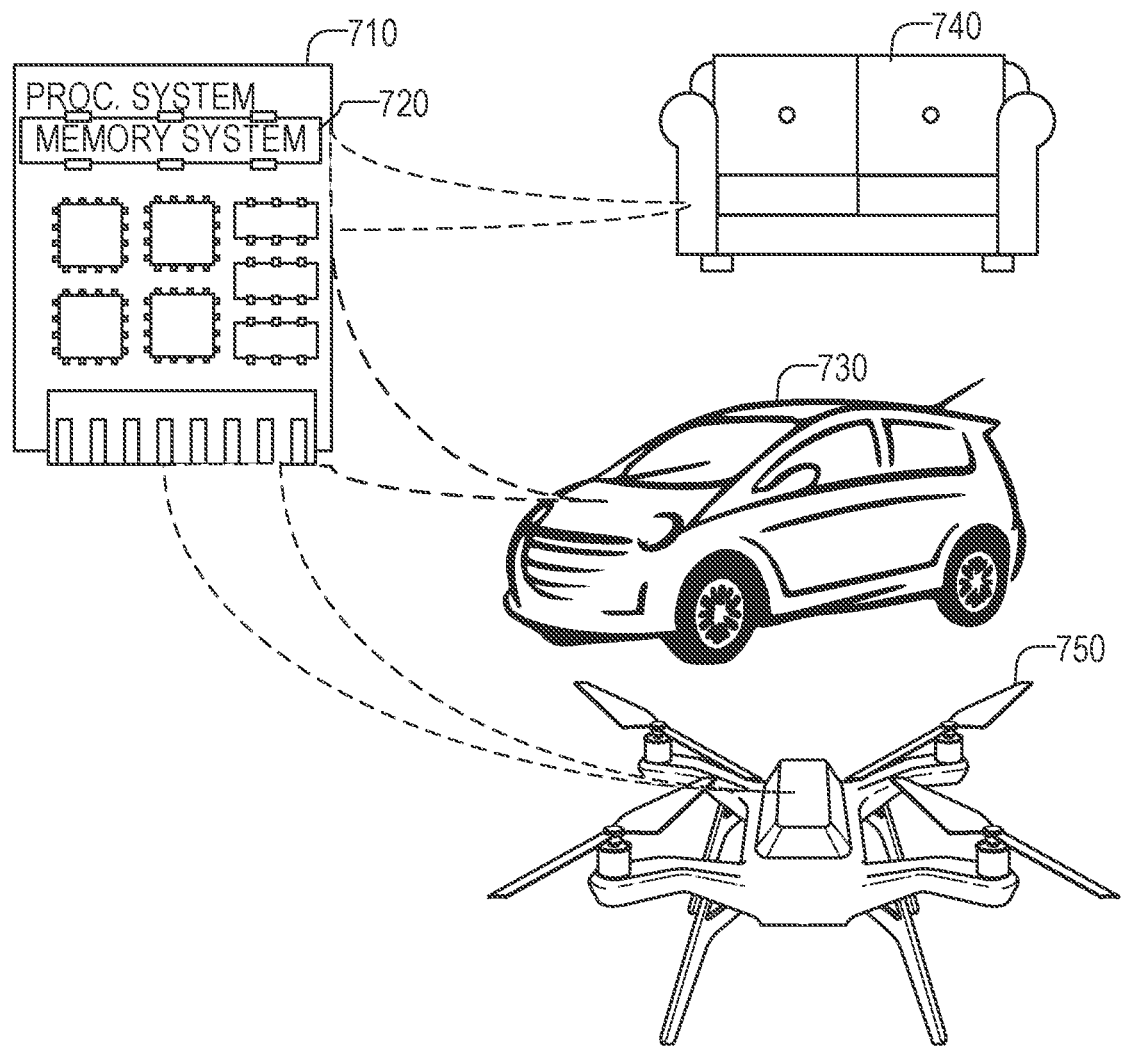
FIG. 7 shows an example computer system with a memory system as part of one or more apparatuses.

FIG. 7 shows an example processing system 710 which may be any host system, as described earlier herein, in communication with a memory system 720 that includes a secure memory device (as described in various example embodiments herein, such as discussed in reference to FIGS. 1-3). Memory system memory system 720 may also include other memory components, such as those described at 506 and 516 of FIG. 5. The processing system 710 may be incorporated into one or more apparatuses 730-750. The processing system 710 may be any device capable of executing instructions (sequential or otherwise); and in many examples, the secure memory device (such as the example device 110) may be used, for example for storing a basic input/output system (BIOS). Example apparatuses in which the device and associated processing system 710 may be used in a wide variety of devices, including, as just a few examples, an automobile 730 (e.g., as part of an infotainment system, a control system, or the like), a drone 750 (e.g., as part of a control system), furniture or appliances 740 (e.g., as part of a sensor system, an entertainment or infotainment system), or the like. In other examples, although not shown, apparatuses may include aeronautical, marine, Internet of Things (IOT), and other devices.

To better illustrate the methods and apparatuses described herein, a non-limiting set of Example embodiments are set forth below as numerically identified Examples.

Example 1 is a secure memory device for secure data storage, including: an accessible data storage area configured to store data; a secret area including a device secret that is a value unique to the device, that is not accessible external to the device, and is accessible under at least one predefined conditions internal to the device; an access control element configured to prevent external access to the device secret; and a generator that generates a derived secret based on the storage data and the device secret that is usable to authenticate the storage data.

In Example 2, the subject matter of Example 1 optionally includes a bus over which the derived secret is communicated to an entity external to the memory device.

In Example 3, the subject matter of Example 2 where the bus is a memory bus.

In Example 4, the subject matter of any one or more of Examples 1-3 where the device secret is established at the time of manufacture of the memory device.

In Example 5, the subject matter of any one or more of Examples 1-4 where the device secret is retained by at least one of fuses and antifuses.

In Example 6, the subject matter of any one or more of Examples 1-5 where the device secret is stored in flash memory cells.

In Example 7, the subject matter of any one or more of Examples 1-6 where the access control element is configured to allow access to the device secret only when the generator is accessing the secret area to generate the derived secret and to disallow access at other times.

In Example 8, the subject matter of any one or more of Examples 1-7 where the secret area comprises read-only memory (ROM).

In Example 9, the subject matter of any one or more of Examples 1-8 where the access control element is a switch that selectively allows access.

In Example 10, the subject matter of any one or more of Examples 1-9 where the access control element allows access to the secret area based on an allow access command.

In Example 11, the subject matter of Example 10 where the allow access command allows access to the secret area in an exclusive mode which allows only one operation to run.

In Example 12, the subject matter of any one or more of Examples 10-11 where the access control element disallows access to the secret based on a disallow access command.

In Example 13, the subject matter of any one or more of Examples 10-12 where the access control element disallows access to the secret area based on a predefined criteria.

In Example 14, the subject matter of any one or more of Examples 1-13 where the generator generates the derived secret using a keyed-hash message authentication code (HMAC).

In Example 15, the subject matter of Example 14 where the HMAC is a Secure Hash Algorithm.

In Example 16, the subject matter of any one or more of Examples 1-15 where the secure memory device is constructed using NOR logic flash memory.

In Example 17, the subject matter of any one or more of Examples 1-16 where the memory is constructed as flash memory.

In Example 18, the subject matter of any one or more of Examples 1-17 optionally include a start location register that points to a start of the accessible data storage area; and a size-related register that allows a size of the accessible data storage area to be determined.

In Example 19, the subject matter of any one or more of Examples 1-18 optionally include general purpose registers that layer address spaces to other chip registers.

Example 20 is a method for operating a secure memory device for secure data storage, including: storing a device secret in a secret area of the device; storing storage data in an accessible data storage area of the device, the device including a start location register that points to a start of the accessible data storage area and a size-related register that allows a size of the accessible data storage area to be determined; allowing access to the device secret by an access control element during an access time period; and generating a derived secret based on the storage data and the device secret accessed during the access time period.

In Example 21, the subject matter of Example 20 optionally includes communicating the derived secret to an external entity.

In Example 22, the subject matter of Example 21 where the derived secret is communicated to an external entity across a bus.

In Example 23, the subject matter of any one or more of Examples 20-22 optionally include allowing access to the device secret by the access control element only when the generator is accessing it to generate the derived secret and to disallow access at other times.

In Example 24, the subject matter of any one or more of Examples 20-23 where the access control element allows access to the device secret based on an allow access command.

In Example 25, the subject matter of any one or more of Examples 20-24 where the generator generates the derived secret using a keyed-hash message authentication code (HMAC).

In Example 26, the subject matter of any one or more of Examples 20-25 optionally include responding to a comparison of the generated derived secret based on a previously calculated derived secret that identifies that the generated derived secret is equal to the previously calculated derived secret by performing a normal memory read operation.

In Example 27, the subject matter of any one or more of Examples 20-26 optionally include responding to a comparison of the generated derived secret based on a previously calculated derived secret that identifies that the generated derived secret is not equal to the previously calculated derived secret, then performing an exception operation.

In Example 28, the subject matter of any one or more of Examples 20-27 optionally include using a unique session key to authenticate device messages or commands.

In Example 29, the subject matter of Example 28 where the unique session key is derived from a unique root key of the device and a counter that changes value with each power-cycle.

Example 30 is a computer-readable medium including instructions thereon that, when executed by a computing device, cause the computing device to perform operations including: storing a device secret in a secret area of the device; storing storage data in an accessible data storage area of the device, the device including a start location register that points to a start of the accessible data storage area and a size-related register that allows a size of the accessible data storage area to be determined; allowing access to the device secret by an access control element during an access time period; generating a derived secret based on the storage data and the device secret accessed during the access time period; and communicating the derived secret to an external entity over a memory bus.

In Example 31, the subject matter of Example 30 where the operations further comprise: responding to a comparison of the generated derived secret based on a previously calculated derived secret; and when the comparison result is that the generated derived secret is equal to the previously calculated derived secret, then performing a normal continued operation; and when the comparison result is that the generated derived secret is not equal to the previously calculated derived secret, then performing an exception operation.

In Example 32, the subject matter of any one or more of Examples 30-31 where the operations further comprise allowing access to the device secret by the access control element only when the generator is accessing it to generate the derived secret and to disallow access at other times.

Example 33 is a host system apparatus, including: a processor; and a secure memory device in communication with the processor, the secure memory device including, an accessible data storage area configured to store data; a secret area including a device secret that is a value unique to the device, that is not accessible external to the device, and is accessible under at least one predefined conditions internal to the device; an access control element configured to prevent external access to the device secret; and a generator that generates a derived secret based on the storage data and the device secret that is usable to authenticate the storage data.

In Example 34, the subject matter of Example 33 where the host system apparatus is a portion of an automobile.

In Example 35, the subject matter of any one or more of Examples 33-34 where the host system apparatus is a portion of an internet of things appliance.

In Example 36, the subject matter of any one or more of Examples 33-35, wherein the secure memory device is operated in accordance with any of the methods of Examples 20-29.

In Example 36, the subject matter of any one or more of Examples 20-29, wherein the method is performed through a secure memory device in accordance with any of Examples 1-19.

In Example 37, the subject matter of any one or more of Examples 30-32, wherein the computer readable medium executes one or more operations of any of the methods of Examples 20-29.

In Example 38, the subject matter of any one or more of Examples 20-29, wherein one or more of the described operations is performed through execution of instructions stored on one or more computer readable media.

For the purposes of promoting an understanding of the principles of this disclosure, reference has been made to the various configurations illustrated in the drawings, and specific language has been used to describe these configurations. However, no limitation of the scope of the inventive subject matter is intended by this specific language, and the inventive subject matter should be construed to encompass all aspects and configurations that would normally occur to one of ordinary skill in the art. The configurations herein may be described in terms of functional block components and various processing steps. Such functional blocks may be realized by any number of components that perform the specified functions. The particular implementations shown and described herein are illustrative configurations and are not intended to otherwise limit the scope of the inventive subject matter in any way. The connecting lines, or connectors shown in the various figures presented may, in some instances, be intended to represent functional relationships and/or physical or logical couplings between the various elements. However, many alternative or additional functional relationships, physical connections or logical connections may be present in a practical device. Moreover, no item or component is essential unless the element is specifically described as "essential" or "critical". Numerous modifications and adaptations will be readily apparent to those skilled in this art.

Configurations, as described herein, may include, or may operate on, logic or a number of components, engines, or modules, circuits, which for the sake of consistency are termed circuits, although it will be understood that these terms may be used interchangeably. Circuits may be hardware, software, or firmware communicatively coupled to one or more processors in order to carry out the operations described herein. Circuits may be hardware circuits, and as such circuits may be considered tangible entities capable of performing specified operations and may be configured or arranged in a certain manner. In a configuration, circuits may be arranged (e.g., internally or with respect to external entities such as other circuits) in a specified manner as a circuit. In a configuration, the whole or part of one or more computing platforms (e.g., a standalone, client or server computing platform) or one or more hardware processors may be configured by firmware or software (e.g., instructions, an application portion, or an application) as a circuit that operates to perform specified operations. In a configuration, the software may reside on a computer readable medium. In a configuration, the software, when executed by the underlying hardware of the circuit, causes the hardware to perform the specified operations. Accordingly, the term hardware circuit is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering configurations in which circuits are temporarily configured, each of the circuits need not be instantiated at any one moment in time. For example, where the circuits comprise a general-purpose hardware processor configured using software; the general-purpose hardware processor may be configured as respective different circuits at different times. Software may accordingly configure a hardware processor, for example, to constitute a particular circuit at one instance of time and to constitute a different circuit at a different instance of time.

The above detailed description includes references to the accompanying drawings, which form a part of the detailed description. The drawings show, by way of illustration, specific configurations that may be practiced. These configurations are also referred to herein as "configurations" or "examples." Such configurations may include elements in addition to those shown or described. However, also contemplated are configurations that include the elements shown or described. Moreover, also contemplated are configurations using any combination or permutation of those elements shown or described (or one or more aspects thereof), either with respect to a particular configuration (or one or more aspects thereof), or with respect to other configurations (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described configurations (or one or more aspects thereof) may be used in combination with others. Other configurations may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as configurations may feature a subset of said features. Further, configurations may include fewer features than those disclosed in a particular configuration. Thus, the following claims are hereby incorporated into the Detailed Description, with a claim standing on its own as a separate configuration. The scope of the configurations disclosed herein is to be determined with reference to the appended claims, along with the full scope of equivalents to which such claims are entitled.

The invention claimed is:

1. A secure memory device for secure data storage, comprising:
 an accessible data storage area configured to store data;
 a secret area comprising a device secret that is a value unique to the secure memory device, where the secret area comprises read-only memory (ROM);
 an access control element comprise of one or more processors configured to control access to the device secret in the secret area, where the access is controlled by a switch to govern access to the secret area such that access is controlled for components that are internal to the secure memory device and for components that are external to the secure memory device, wherein the access control element allows access to the secret area based on an allow access command, and wherein the allow access command allows access to the secret area in an exclusive mode which allows only one operation to run on the secure memory device;
 a generator that generates a derived secret based on the data stored in the accessible data storage area and the device secret stored in the secret area, where the derived secret forms the basis of authenticated communication between the secure memory device and an external device for operations on the accessible data storage area, wherein the generator is a component internal to the secure memory device, and wherein the switch is disposed between the secret area and the generator to control access to the secret area for the generator; and
 a memory bus over which the derived secret is communicated to the external device.

2. The secure memory device of claim 1, where the device secret is established at the time of manufacture of the secure memory device.

3. The secure memory device of claim 1, where the device secret is retained by at least one of fuses and antifuses.

4. The secure memory device of claim 1, where the device secret is stored in flash memory cells.

5. The secure memory device of claim 1, where the access control element is configured to allow access to the device secret only when the generator is accessing the secret area to generate the derived secret and to disallow access at other times.

6. The secure memory device of claim 1, where the access control element disallows access to the secret based on a disallow access command.

7. The secure memory device of claim 1, where the access control element disallows access to the secret area based on a predefined criteria.

8. The secure memory device of claim 1, where the derived secret is used in an keyed-hash message authentication code (HMAC) session key between the secure memory device and the external device.

9. The secure memory device of claim 1, where the secure memory device is constructed using NOR logic flash memory.

10. The secure memory device of claim 1, where the secure memory device is constructed as flash memory.

11. The secure memory device of claim 1, further comprising:
 a start location register that points to a start of the accessible data storage area; and a size-related register that allows a size of the accessible data storage area to be determined.

12. The secure memory device of claim 1, further comprising:
 general purpose registers that layer address spaces to other chip registers.

13. A method for operating a secure memory device for secure data storage, comprising:
 storing a device secret in a secret area of the secure memory device, the device secret being a value that is unique to the secure memory device, where the secret area comprises read-only memory (ROM);
 storing storage data in an accessible data storage area of the secure memory device;
 allowing, by an access control element comprise of one or more processors, a generator of the secure memory device access to the device secret, wherein the access control element is a switch that governs access to the secret area of the secure memory device such that access is controlled for components that are internal to the secure memory device and for components that are external to the secure memory device, wherein the access control element allows access to the secret area based on an allow access command, and wherein the allow access command allows access to the secret area in an exclusive mode which allows only one operation to run on the secure memory device;
 generating, by the generator, a derived secret based on the storage data stored in the accessible data storage area and the device secret stored in the secret area, where the derived secret forms the basis of authenticated communication between the secure memory device and an external entity for operations on the accessible data storage area, wherein the generator is a component internal to the secure memory device, and wherein the switch is disposed between the secret area and the generator to control access to the secret area for the generator; and
 communicating the derived secret to the external entity over a memory bus.

14. The method of claim 13, further comprising:
 allowing access to the device secret by the access control element only when the generator accesses the device secret to generate the derived secret; and
 disallowing access at other times.

15. The method of claim 13, where the generator uses a keyed-hash message authentication code (HMAC) to generate the derived secret.

16. The method of claim 13, further comprising: responding to a comparison of the generated derived secret based on a previously calculated derived secret that identifies that the generated derived secret is equal to the previously calculated derived secret by performing a normal memory read operation.

17. The method of claim 13, further comprising: responding to a comparison of the generated derived secret based on a previously calculated derived secret that identifies that the generated derived secret is not equal to the previously calculated derived secret, then performing an exception operation.

18. The method of claim 13, further comprising using a unique session key to authenticate the secure memory device messages or commands.

19. A non-transitory computer-readable medium comprising instructions thereon that, when executed by a computing device, cause the computing device to perform operations comprising:

storing a device secret in a secret area of a secure memory device, the device secret being a value that is unique to the secure memory device, where the secret area comprises read-only memory (ROM);
storing storage data in an accessible data storage area of the secure memory device;
allowing, by an access control element comprise of one or more processors, a generator of the secure memory device access to the device secret in the secret area, where the access control element being a switch disposed between the secret area and the generator, wherein the access control element allows access to the secret area based on an allow access command, and wherein the allow access command allows access to the secret area in an exclusive mode which allows only one operation to run on the computing device;
generating, by the generator, a derived secret based on the storage data and the device secret, where the derived secret forms the basis of authenticated communication between the secure memory device and an external entity for operations on the accessible data storage area; and
communicating the derived secret to the external entity over a memory bus.

20. The non-transitory computer readable medium of claim 19, where the operations further comprise:
responding to a comparison of the generated derived secret based on a previously calculated derived secret; and
when the comparison result is that the generated derived secret is equal to the previously calculated derived secret, then performing a normal continued operation; and
when the comparison result is that the generated derived secret is not equal to the previously calculated derived secret, then performing an exception operation.

21. The non-transitory computer readable medium of claim 19, where the operations further comprise:
allowing access to the device secret by the access control element only when the generator accesses the device secret to generate the derived secret; and
disallowing access at other times.

22. A host system apparatus, comprising:
a processor; and
a secure memory device in communication with the processor, the secure memory device comprising:
an accessible data storage area configured to store data;
a secret area comprising a device secret that is a value unique to the secure memory device, where the secret area comprises read-only memory (ROM);
an access control element comprise of one or more processors configured to control access to the device secret in the secret area, where the access is controlled by a switch to govern access to the secret area such that access is controlled for components that are internal to the secure memory device and for components that are external to the secure memory device, wherein the access control element allows access to the secret area based on an allow access command, and wherein the allow access command allows access to the secret area in an exclusive mode which allows only one operation to run on the secure memory device;
a generator that generates a derived secret based on the data stored in the accessible data storage area and the device secret stored in the secret area, where the derived secret forms the basis of authenticated communication between the secure memory device and an external device for operations on the accessible data storage area, where the external device is external to the secure memory device, wherein the generator is a component internal to the secure memory device, and wherein the switch is disposed between the secret area and the generator to control access to the secret area for the generator; and
a memory bus over which the derived secret is communicated to the external device.

23. The host system apparatus of claim 22, wherein the host system apparatus is a portion of an automobile.

24. The host system apparatus of claim 22, wherein the host system apparatus is a portion of an internet of things appliance.

* * * * *